(12) United States Patent
Dieter

(10) Patent No.: US 8,357,326 B2
(45) Date of Patent: Jan. 22, 2013

(54) METHOD AND DEVICE FOR PRODUCING A TUBULAR OBJECT FROM THERMOPLASTIC MATERIAL

(75) Inventor: Kiefer Dieter, Weissenburg (DE)

(73) Assignee: Ossberger GmbH & Co. (DE)

( * ) Notice: Subject to any disclaimer, the term of this patent is extended or adjusted under 35 U.S.C. 154(b) by 736 days.

(21) Appl. No.: 11/788,936

(22) Filed: Apr. 23, 2007

(65) Prior Publication Data
US 2007/0245791 A1 Oct. 25, 2007

(30) Foreign Application Priority Data
Apr. 24, 2006 (DE) .................. 10 2006 018 883

(51) Int. Cl.
B29C 49/04 (2006.01)
B29C 49/30 (2006.01)
B29C 49/32 (2006.01)
B29C 49/78 (2006.01)

(52) U.S. Cl. ........ 264/506; 264/539; 264/541; 425/146; 425/150; 425/530; 425/532; 425/533

(58) Field of Classification Search .................. 425/150, 425/522–541, 145–147; 264/541, 506, 539
See application file for complete search history.

(56) References Cited

U.S. PATENT DOCUMENTS

| | | | |
|---|---|---|---|
| 3,611,483 A | 10/1971 | Amsden et al. | |
| 4,188,179 A | 2/1980 | Linss et al. | |
| 5,185,109 A | 2/1993 | Habig et al. | |
| 5,330,342 A | 7/1994 | Linss et al. | |
| 5,997,778 A * | 12/1999 | Bulgrin | 264/40.1 |
| 2002/0182355 A1 | 12/2002 | Kawamoto et al. | |
| 2003/0193109 A1* | 10/2003 | Zikeli et al. | 264/187 |

FOREIGN PATENT DOCUMENTS

| | | |
|---|---|---|
| DE | 2426735 | 11/1975 |
| DE | 3416781 | 11/1985 |
| DE | 19813668 | 9/1999 |
| EP | 0058297 A1 | 8/1982 |
| EP | 0445774 A1 | 9/1991 |
| EP | 0535254 | 4/1993 |
| EP | 0535254 A1 | 4/1993 |
| EP | 1281896 A2 | 2/2003 |
| GB | 1 493 453 | 11/1977 |

OTHER PUBLICATIONS

Hochgrebe M: Automatisierung von Blas—und Spritzblasmaschinen, Kunststoffberater, Jul./Aug., No. 7/8, 1994, 6 pages.
Haub K: Blasgeformte TPE-Aschmanschetten, Blow-moulded TPE Axle Sleeves, Optimierte Funktionsteile, Kunststoffe, 1996, 3 pages.

* cited by examiner

Primary Examiner — Katarzyna Wyrozebski Lee
Assistant Examiner — Scott W Dodds
(74) Attorney, Agent, or Firm — Hiscock & Barclay, LLP

(57) ABSTRACT

A device for producing a tubular object from thermoplastic material includes a die, a plunger, and a withdrawal unit. The movements of the withdrawal unit, plunger and die body are controlled such that the movement of the withdrawal unit is carried out according to a freely adjustable velocity profile over the path of the withdrawal unit. Movement of the plunger is carried out according to a freely adjustable velocity profile over the plunger path and movement of the die body is carried out according to a freely adjustable position profile over the path of the withdrawal unit or plunger. In this manner, the wall thickness of the tubular object may be adjusted with high accuracy over its length.

9 Claims, 3 Drawing Sheets

PRIOR ART

METHOD AND DEVICE FOR PRODUCING A TUBULAR OBJECT FROM THERMOPLASTIC MATERIAL

BACKGROUND OF THE INVENTION

The present invention relates to a method and a device for producing a tubular object from thermoplastic material, for example a bellows, the wall thickness thereof being adjustable over its length.

A method and a device of this type are, for example, known from EP 0 535 254 B1 of the applicant. The device disclosed therein comprises a die with a die land and a die body which, between them, form an annular die opening, the die body being movable relative to the die land, in order to alter the cross-sectional surface of the die opening, an extrusion device with a plunger, which during its movement extrudes a quantity of plasticized plastic material determined by the plunger path through the die, in order to produce a tubular plastic object. A withdrawal unit may be moved from an initial position adjacent to the die in the direction away from the die, in order to guide the tubular plastic object emerging from the die during the extrusion process, the path of the withdrawal unit determining the length of the tubular plastic object.

In the device disclosed therein, control devices are provided for the drives of the die body, the plunger and the withdrawal unit, which comprise a computer and path sensors for these movements, the computer controlling the three drives according to a predeterminable program. The control is carried out such that the velocity increase of the withdrawal unit is controlled during its initial movement, and in that, during the further movement of the withdrawal unit, a gap width of the die opening which is controlled so as to increase and decrease in an oscillating manner is superimposed on a continuously controlled velocity characteristic of the withdrawal unit, such that the thickness of the wall formed is altered in a wave-like manner, over valleys and peaks. The object produced in this manner is a preform for blow-molding a bellows.

SUMMARY OF THE INVENTION

An object of the present invention is to develop a method and a device of this type such that tubular objects made of thermoplastic material formed in any manner thereby, may be produced with a precisely adjustable wall thickness over the length of the object.

According to the present invention, the movements of the withdrawal unit, the plunger and the die body are controlled, such that the movement of the withdrawal unit is carried out according to a freely adjustable velocity profile over the path of the withdrawal unit, the movement of the plunger is carried out according to a freely adjustable velocity profile over the path of the plunger, and the movement of the die body is carried out according to a freely adjustable position profile over the path of the withdrawal unit or the path of the plunger. As a result, the movement of the die body is carried out for the same duration as the movement of the withdrawal unit or the plunger.

In this manner, the velocity characteristic of the plunger on the one hand and the velocity characteristic of the withdrawal unit on the other hand, may be freely adjusted independently of one another, whilst the movement of the die body and thus the alteration of the die opening follows the movement of the plunger or the withdrawal unit as a "slave", so to speak.

As the velocity profiles for the movements of the plunger and the withdrawal unit are freely adjustable, influences impairing the production accuracy, such as subsequent swelling of the plasticized plastic material or sagging of the tubular plastic object may already be optimally considered during the process setting. In this manner, the wall thickness of the tubular plastic objects and thus the finished tubular objects are adjusted over their length with extremely high accuracy.

The method according to the invention offers the possibility of allowing the movements of the withdrawal unit and the plunger to start at the same time, but moreover, to be carried out asynchronously, such that the duration of the movement of the withdrawal unit and the duration of the movement of the plunger are then unequal. As a result, as already mentioned, influences impairing the process sequence may be optimally considered.

In principle, however, an automatic "synchronization" of the movements of the plunger and of the injection-molding die is also possible. To this end, and according to a further embodiment, the control unit may be adjusted such that the velocity profile for the withdrawal unit is automatically adapted to the velocity profile for the movement of the plunger, or vice versa, in order to make the duration of the movements of the withdrawal unit and the plunger equal. The foregoing feature is advantageous in that, with an alteration, for example, of the velocity profile of the plunger, no further manual adjustment of the velocity profile is required for the movement of the withdrawal unit. Preferably, the tubular plastic object produced by the method according to the invention is produced as a preform for a blow-molding process in which, for example, a bellows is produced from the preform. Reference is, however, made to the fact that any tubular objects made from thermoplastic material may be produced by the method according to the invention, the wall thickness thereof being able to be altered over their length and being intended to be adjusted with a high degree of accuracy.

Further advantageous embodiments of the invention are revealed from the following Detailed Description and the following claims.

BRIEF DESCRIPTION OF THE DRAWINGS

An embodiment of the invention is described in more detail with reference to the drawings, in which.

DETAILED DESCRIPTION

Figure 1:
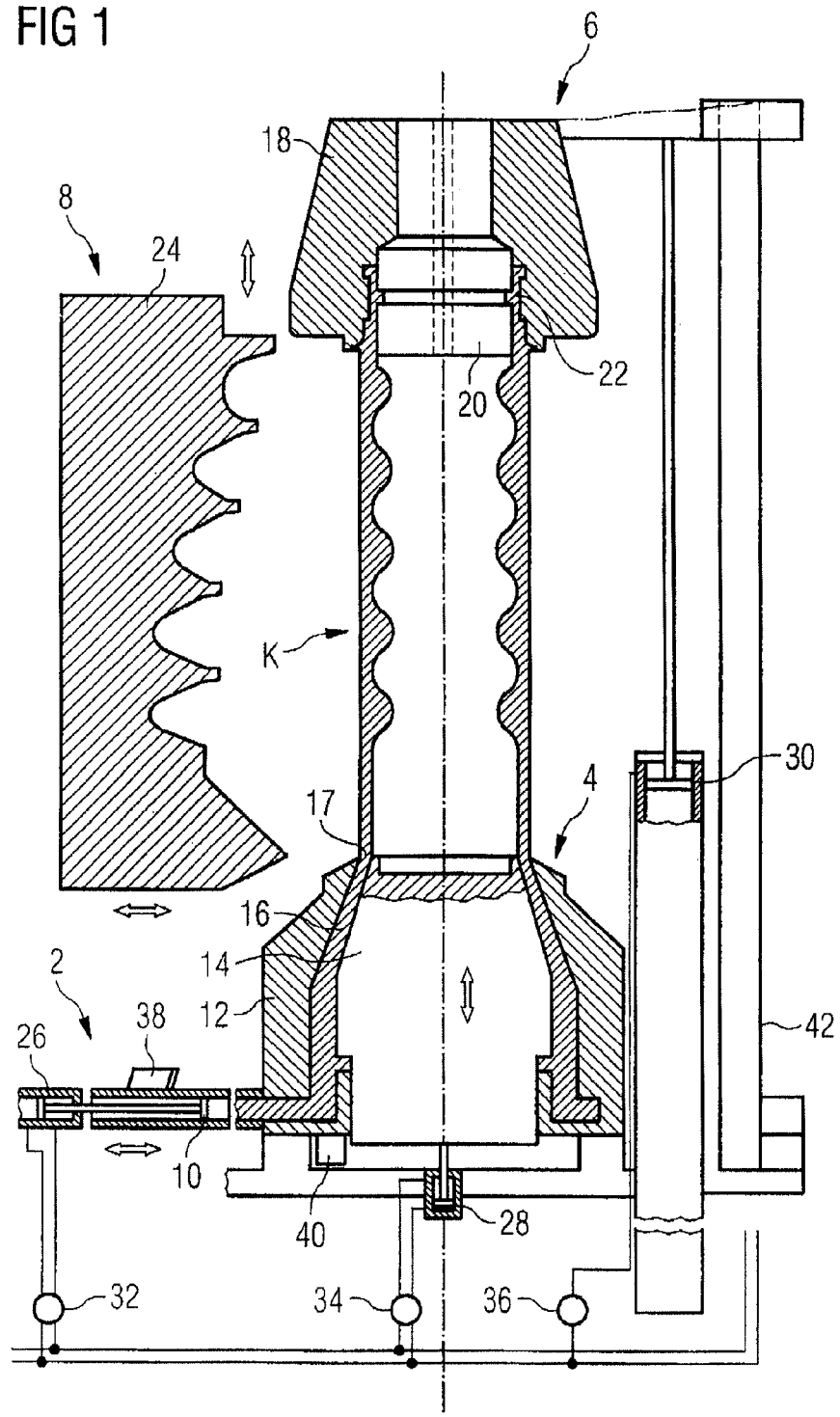
FIG. 1 is an extensive schematic sectional view of a device for producing a preform for blow-molding a bellows.

The device shown in FIG. 1 corresponds in its essential construction to the device according to the aforementioned EP 0 535 254 B1. It serves for producing a tubular object made of thermoplastic material in the form of a preform for blow-molding a bellows. In this case, it is merely one embodiment of the invention. As already mentioned, by means of the method and device of the invention, any tubular objects may be produced from thermoplastic material, the wall thickness thereof being intended to be adjusted over their length in a predetermined manner and with a high degree of accuracy.

As the principal construction of the device of FIG. 1 is known from the aforementioned patent, the following description is restricted to the components which are essential for the description of the invention.

The device of FIG. 1 consists of an extrusion device 2, indicated only in a fragmentary manner, a die 4, a withdrawal unit 6 and a blow mold 8.

The extrusion device 2 comprises a plunger 10 which may be moved in a linear manner, for ejecting plasticized plastic material through the die 4. The die 4 is made up of a die land 12 and an inner, partially conically configured die body 14, which form between them a die channel 16. The die channel 16 terminates in an annular die opening 17. As indicated by a double arrow 15, the die body 14 may be displaced in a linear manner relative to the die land 12, in order to alter the cross-sectional surface of the die opening 17.

The withdrawal unit 6 comprises a mold body 18 and a blow mandrel 20 arranged therein which, between them, define a mold cavity 22. As also indicated by a double arrow 21, the withdrawal unit 6 may be moved back and forth in a linear manner along the longitudinal axis 7 of the die 4.

The blow mold 8 comprises two blow mold halves of which only one blow mold half 24 is shown and which, also indicated by a double arrow 23, are movable back and forth transversely relative to the longitudinal axis 7 of the die 4 and the withdrawal unit 6.

For moving the plunger 10, the die body 14 and the withdrawal unit 6, one respective hydraulic drive 26 and/or 28 and/or 30 is provided in the form of a piston-cylinder-unit, the pressurization thereof being respectively controlled by a control valve 32 and/or 34 and/or 36.

At the start of the production of the tubular plastic object K, the withdrawal unit 6 is in an initial position adjacent to the die 4. The plunger 10 is then moved in the ejection direction by its drive 26, whereby a quantity of plasticized plastic material, determined by the plunger path, is forced out of a melt reservoir (not shown) via the die channel 16 through the die opening 17. In this connection, a head part of the plastic object K to be produced is first created by an injection-molding process in the mold cavity 22 of the withdrawal unit 6. After completing this head part, the actual extrusion process is carried out, in which the withdrawal unit 6 is moved by its drive 30 from the initial position away from the die 4. In this connection, the withdrawal unit 6 guides the plastic object K on its head part, the path of the withdrawal unit 6 determining the length of the plastic object K.

During the extrusion process, the die body 14 is moved by its drive 28 relative to the die land 12, in order to alter the cross-sectional surface of the die opening 17 according to the wall thickness of the plastic object K to be adjusted. At the end of the extrusion process, the end of the plastic object K is pinched off by the die body 14 being brought to bear against the die land 12.

Figure 2:
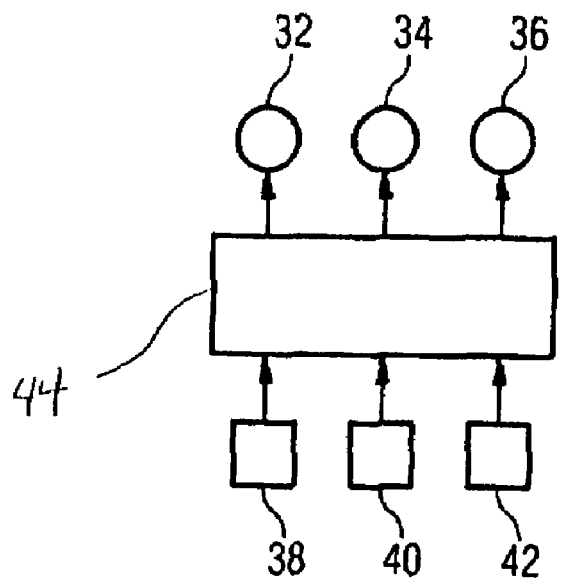
FIG. 2 shows a rudimentary schematic view of a control unit for the device of FIG. 1.

To control the movements of the plunger 10, the die body 14 and the withdrawal unit 6, a control unit is provided which, in the embodiment shown, comprises path sensors 38, 40, 42 for the movements of the plunger 10, the die body 14 and the withdrawal unit 6, respectively, as well as a production control unit in the form of a computer 44, FIG. 2. As indicated schematically in FIG. 2, the output signals of the path sensors 38, 40, 42 are supplied to the computer 44, which contains a controller for generating control signals for the control valves 32, 34, 36 and thus for the drives 26, 28, 30, as is explained below in more detail.

Figure 3:
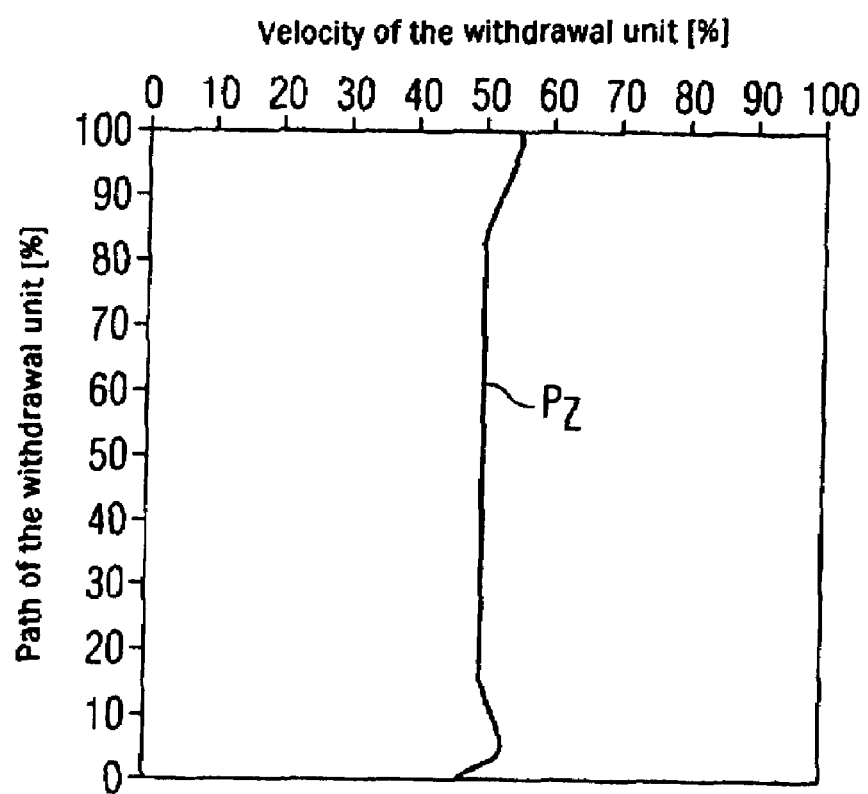
FIGS. 3 to 5 show respective diagrams for the movement path of the withdrawal unit, the plunger and the die body of the device in FIG. 1.
Figure 4:
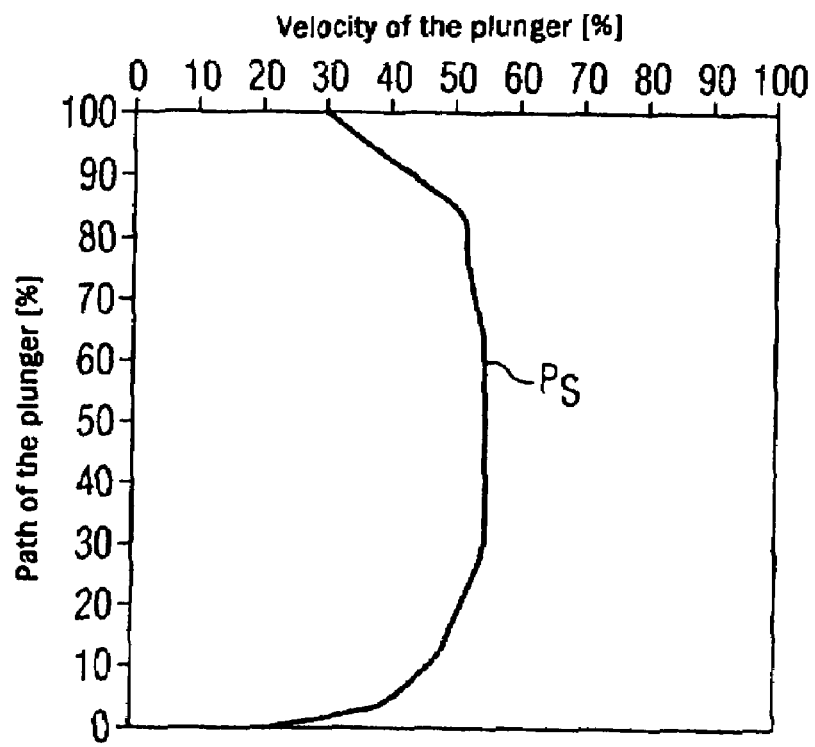
Figure 5:
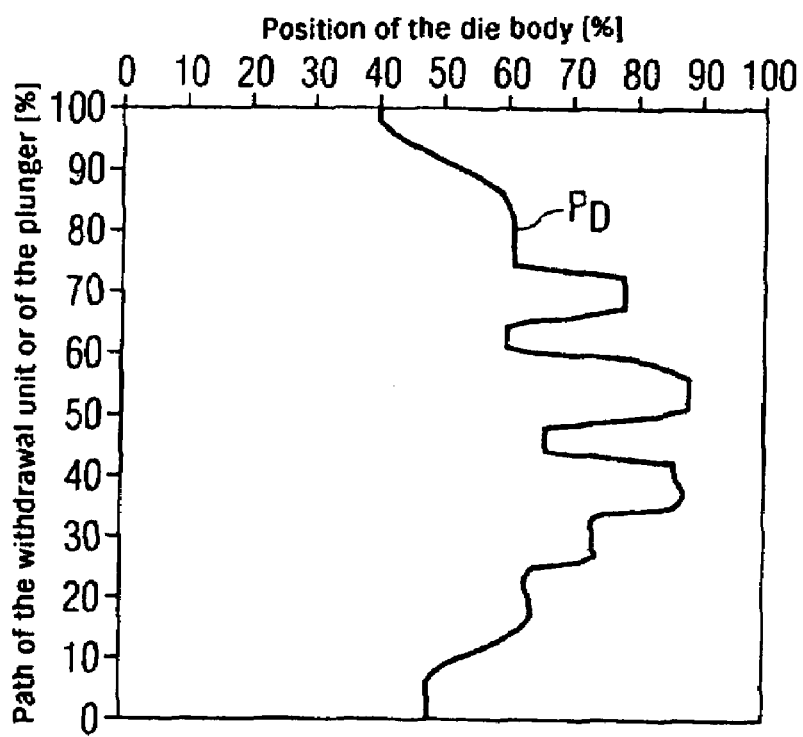

Reference value curves for the movements of the plunger 10, the die body 14 and the withdrawal unit 6 are stored in the computer 44, as illustrated by way of example in FIGS. 3 to 5:

As the diagram of FIG. 3 shows, a reference value curve is provided in the form of a velocity profile $P_Z$ over the path of the withdrawal unit 6, for the movement of the withdrawal unit 6. The velocity profile $P_Z$ thus represents the reference velocity of the withdrawal unit 6 over the path of the withdrawal unit 6, the velocity and the path being provided in the form of percentage figures.

As FIG. 4 shows, a reference value curve in the form of a velocity profile $P_S$ is provided for the velocity of the plunger 10, over the path of the plunger 10, the velocity and the path being provided again in the form of percentage figures.

FIG. 5 shows that for the movement of the die body 14, a reference point curve in the form of a position profile $P_D$ is provided over the path of the withdrawal unit 6 or the path of the plunger 10. The position (the path) rather than the velocity is therefore predetermined for the movement of the die body 14.

The diagrams of FIGS. 3 to 5 merely represent exemplary versions of the velocity profiles $P_Z$, $P_S$ and the position profile $P_D$. In reality, these profiles (reference value curves) are freely adjustable, in order to be able to optimally adapt the movements of the withdrawal unit 6, the plunger 10 and the die body 14 to the respective application.

Preferably, the profiles $P_Z$, $P_S$ and $P_D$ are respectively adjusted over a larger number of segments. 101 segments have been selected in the disclosed embodiment. It is, however, understood that a different number of segments may also be selected.

Actual values for the velocity of the plunger 10 and the withdrawal unit 6 are detected from the path signals of the path sensors 38 and 42. This detection may be carried out in the path sensors 38 and 42 themselves or even in the computer 44. The path signals of the path sensor 40 may be directly used as actual values for the positions of the die body 14.

The controller of the computer 44, using the actual values derived by the path sensors and the stored reference values of the velocity profiles $P_Z$, $P_S$ and the position profile $P_D$, may now determine control signals, by means of which the control valves 32, 34, 36 and thus the drives 26, 28, 30 of each of the plunger 10, the die body 14 and the withdrawal unit 6 are controlled. The withdrawal unit 6, the plunger 10 and the die body 14 thus carry out a movement according to the respective velocity profiles $P_Z$, $P_S$ and/or position profile $P_D$.

The velocity profile $P_Z$ for the withdrawal unit 6 and the velocity profile $P_S$ for the plunger 10 are freely adjustable and thus are independent of one another. The movements of the withdrawal unit 6 and the plunger 10, therefore, do not have to be carried out concurrently. The duration and the start and the end of their movements may, therefore, be selected to be unequal. In the embodiment, in which the device serves to produce a bellows, the velocity profiles $P_Z$ and $P_S$ are, for example, selected such that the movements of the withdrawal unit 6 and the plunger 10 start at the same time, but end at different times.

As already mentioned above, however, an automatic "synchronization" between the movements of the withdrawal unit 6 and the plunger 10 is possible, whereby it is automatically ensured that the duration of the movement of the plunger and the duration of the withdrawal unit are equal. To this end, the computer 44 is programmed such that it is able to be adjusted between two operating states. In the one operating state, the velocity profiles $P_Z$ and $P_S$ may be adjusted independently of one another. In the other operating states the program of the computer 44 automatically adapts the velocity profile $P_Z$ for the withdrawal unit to the velocity profile $P_S$ for the plunger or vice-versa, in order to make the duration of the movements of the plunger and the withdrawal unit equal. If, for example, the velocity profile $P_S$ is altered for the plunger 10, in order to produce a plastic object K of different wall thickness distribution, the program alters the velocity profile $P_Z$ for the withdrawal unit 6 automatically, such that by a corresponding displacement of $P_Z$ the movements of the withdrawal unit and the plunger are carried out for the same duration.

As the position profile $P_D$ for the die body 14 is fixed over the path of the withdrawal unit 6 or the path of the plunger 10, in its movement the die body 14 follows the withdrawal unit and/or the plunger as a "slave".

The velocity profiles $P_Z$, $P_S$ and the position profile $P_D$ are adjusted such that when producing the plastic body K, FIG. 1, a desired wall thickness distribution results. In the example shown of the production of a bellows, of which the geometry is indicated by the blow mold half 24 in FIG. 1, a tubular plastic object K results having a wall thickness that increases and decreases, in an oscillating manner, over its length.

The free adjustability of the velocity profiles $P_Z$, $P_S$ and the position profile $P_D$ allow an optimal consideration of the influences impairing the production process, such as, for examples a subsequent swelling of the plastic material or sagging of the tubular plastic object K.

A particularly critical point is the transition between the head part (mold cavity 22) and the central part of the plastic object K. As may be ascertained from the diagrams of FIGS. 3 and 4, this difficulty may be countered by a very specific curve characteristic at the start of the extrusion process.

The end of the bellows produced from the plastic object K must generally be cut off by a specific cutting process (not shown), in order to obtain a clean end of the bellows. The method according to the invention for controlling the velocities of the withdrawal die 6 and the plunger 10, as well as the position of the die body 14, allows a specific and precise reduction of the wall thickness of the part of the plastic body K to be cut off, without this reduction in wall thickness impairing the transition between the part to be cut off and the remaining part of the plastic body K. Examples of appropriately selected velocity and position profiles $P_Z$, $P_S$ and $P_D$ towards the end of the extrusion process may be ascertained from the diagrams of FIGS. 3 to 5. As a result, the quantity of rejects occurring during the cutting-off process may be significantly reduced.

Reference is further made to the fact that the curves shown in the diagrams of FIGS. 3 to 5 are merely examples of possible profiles, as have been selected for producing a specific bellows. For producing other bellows and in particular for producing other tubular objects, the freely adjustable profiles $P_Z$, $P_S$ and $P_D$ may have very different curve characteristics.

I claim:

1. A method for producing a tubular preform from thermoplastic material for a blow-molding process in which a bellows is produced from the preform by means of a device, said device comprising:
   a die with a die land and a die body which form, between them, an annular die opening, the die body being movable relative to the die land in order to alter the cross-sectional surface of the die opening;
   an extrusion device with a plunger which during its movement extrudes a specific quantity of plasticized plastic material determined by the plunger path through the die in order to produce the tubular plastic preform;
   a withdrawal unit which is movable from an initial position adjacent to the die in the direction away from the die, in order to guide the tubular plastic preform emerging from the die, during the extrusion process, the path of the withdrawal unit determining the length of the tubular plastic preform; and wherein the method includes the steps of:
   determining path signals of the withdrawal unit, the die body and the plunger, respectively, using path sensors;
   providing said path signals of said path sensors to a control unit, and
   determining actual values of a velocity of said plunger and said withdrawal unit, respectively, as well as a position of said die body from the path signals of said path sensors;
   wherein said control unit serves for controlling the movements of the die body, the plunger and the withdrawal unit, according to a predeterminable program for the purpose of adjusting the wall thickness of the tubular plastic preform over its length, said method including the additional steps of:
   individually adapting reference value curves for the movements of the withdrawal unit, the plunger and the die body respectively;
   storing said individually adapted reference value curves in said control unit, wherein
   the reference curve of the movement of the withdrawal unit is a freely adjustable velocity profile of the withdrawal unit over the path of the withdrawal unit,
   the reference curve of the movement of the plunger is a freely adjustable velocity profile of the plunger over the path of the plunger, wherein said velocity profiles of said withdrawal unit and said plunger are adjustable independently of each other, and wherein
   said reference curve of the movement of the die body is a position profile of the die body over the path of the withdrawal unit or the path of the plunger,
   determining control signals of said plunger, said die body and said withdrawal unit based on the derived actual values and the stored reference curves, and
   controlling drives of said plunger, said die body, and said withdrawal unit, respectively, by means of the determined control signals, so that
   the movement of said withdrawal unit is carried out according to said freely adjustable velocity profile over the path of said withdrawal unit and the movement of said plunger is carried out according to said freely adjustable velocity profile over the path of said plunger, and
   the movement of the die body is carried out according to said freely adjustable position profile over the path of the withdrawal unit or the path of the plunger, so that the movement of the die body is carried out for the same duration as the movement of the withdrawal unit or the plunger, said method including the additional step of fixing the position profile for the die body over the path of only one of the withdrawal unit and the plunger such that the movement of the die body follows the withdrawal unit or the plunger as a "slave".

2. A method according to claim 1, including the additional steps of adjusting the velocity profiles for the movements of the withdrawal unit and the plunger such that the duration of the movement of the withdrawal unit and the duration of the movement of the plunger are unequal.

3. A method according to claim 1, including the additional steps of adjusting the velocity profiles for the movements of the withdrawal unit and the plunger such that the duration of the movement of the withdrawal unit and the duration of the movement of the plunger are equal.

4. A method according to claim 3, including the additional steps of adjusting the control unit such that the velocity profile for the withdrawal unit is automatically adapted to the velocity profile for the movement of the plunger or vice-versa, in order to make the duration of the movements of the withdrawal unit and the plunger equal.

5. A method according to claim 2, including the additional steps of adjusting the velocity profiles for the movements of the withdrawal unit and the plunger such that the movements of the withdrawal unit and the plunger start at the same time.

6. A method according to claim 1, including the additional steps of adjusting the velocity profile for the movement of the withdrawal unit, the velocity profile for the movement of the plunger and the position profile for the movement of the die body, respectively, over a large number of segments into which said profiles are subdivided.

7. A method according to claim 1, wherein said device includes a head part injection molded in the withdrawal unit, said method including the additional step of guarding the tubular plastic preform on said head part during the extrusion process by the withdrawal unit.

8. A device for producing a tubular preform from thermoplastic material for a blow-molding process in which a bellows is produced from the preform, said device comprising:
- a die with a die land and a die body which form, between them, an annular die opening, the die body being movable relative to the die land in order to alter the cross-sectional surface of the die opening;
- an extrusion device with a plunger which, with an ejection movement, extrudes a specific quantity of plasticized plastic material through the die, determined by the plunger path, in order to produce the tubular plastic preform;
- a withdrawal unit which is movable from an initial position adjacent to the die in the direction away from the die, in order to guide the tubular plastic preform emerging from the die, during the extrusion process, the path of the withdrawal unit determining the length of the plastic preform; wherein
- a path sensor determines path signals of the withdrawal unit, the die body and the plunger, respectively,
- said path signals of said path sensors being provided to a control unit, and actual values of a velocity of said plunger and said withdrawal unit, respectively, and a position of said die body are determined from said path signals of said path sensors; said control unit which controls the movements of the withdrawal unit, the plunger and the die body by means of a predeterminable program, is adapted to individually adapt and store reference value curves for the movements of said withdrawal unit, said plunger and said die body, respectively, such that
- the reference curve of the movement of the withdrawal unit is a freely adjustable velocity profile of the withdrawal unit over the path of the withdrawal unit,
- the reference curve of the movement of the plunger is a freely adjustable velocity profile of the plunger over the path of the plunger, wherein the velocity profiles of said withdrawal unit and the plunger are adjustable independently of each other, and wherein
- the reference curve of the movement of the die body is a position profile of the die body over the path of the withdrawal unit or the path of the plunger,
- the withdrawal unit is movable according to the freely adjustable velocity profile over the path of the withdrawal unit and the plunger is movable according to said freely adjustable velocity profile over the path of said plunger, and
- the die body is movable according to the freely adjustable position profile over the path of the withdrawal unit or the path of the plunger, so that the movement of the die body is carried out for the same duration as the movement of the withdrawal unit or the plunger and in which the position profile of the die body is fixed over the path of only one of the withdrawal unit or the plunger, thereby making the die body a slave to said one of the withdrawal unit or the plunger.

9. A device according to claim 8, wherein the control unit comprises
- a computer with a controller which, depending on the differences between the actual values and the reference values of the velocity profiles for the movements of the withdrawal unit and the plunger as well as the position profile for the movements of the die body, generates control signals for drives of the withdrawal unit, the plunger and the die body.

\* \* \* \* \*